(12) United States Patent
Wang

(10) Patent No.: US 8,783,290 B2
(45) Date of Patent: Jul. 22, 2014

(54) FINE CERAMIC SWITCH VALVE FOR BATHTUB

(75) Inventor: Hsiang-Shih Wang, Changhua (TW)

(73) Assignee: Geann Industrial Co. Ltd., Changhua (TW)

( * ) Notice: Subject to any disclaimer, the term of this patent is extended or adjusted under 35 U.S.C. 154(b) by 397 days.

(21) Appl. No.: 13/368,080

(22) Filed: Feb. 7, 2012

(65) Prior Publication Data

US 2013/0199642 A1  Aug. 8, 2013

(51) Int. Cl.
*F16K 11/074* (2006.01)

(52) U.S. Cl.
USPC .................................................. 137/625.46

(58) Field of Classification Search
USPC .............. 137/625.15, 625.16, 625.46, 625.47
See application file for complete search history.

(56) References Cited

U.S. PATENT DOCUMENTS

| | | | | |
|---|---|---|---|---|
| 5,193,582 A | * | 3/1993 | Antoniello et al. | 137/625.14 |
| 5,901,387 A | * | 5/1999 | Fan | 4/675 |
| 6,079,061 A | * | 6/2000 | Fan | 4/676 |
| 6,135,152 A | * | 10/2000 | Knapp | 137/625.41 |
| 6,634,380 B2 | * | 10/2003 | Bartkus et al. | 137/625.46 |
| 7,509,976 B2 | * | 3/2009 | McNerney et al. | 137/625.11 |
| 7,896,025 B2 | * | 3/2011 | Hanson | 137/454.6 |

* cited by examiner

*Primary Examiner* — John Fox
(74) *Attorney, Agent, or Firm* — Che-Yang Chen; Law Office of Michael Chen

(57) ABSTRACT

A fine ceramic switch valve for a bathtub includes a water control valve, a valve piece, a switch valve piece, a control shaft, a valve cover, and a valve shell. The water control valve has a first water outlet hole and a second water outlet hole for the bathtub and shower head. The first water outlet hole is smaller to form a smaller water channel, so the water pressure is higher to generate a stronger water flow and effectively reduce water output. The second water outlet hole is larger to form a larger water channel, so when the water passes through the second water outlet hole, as well as a fully open through hole of the bottom of the water control valve, the amount of water can be significantly increased to fill the bathtub and thus to increase the convenience and practicability of the switch valve structure.

7 Claims, 6 Drawing Sheets

FINE CERAMIC SWITCH VALVE FOR BATHTUB

FIELD OF THE INVENTION

The present invention relates to a switch valve structure, and more particularly to a fine ceramic switch valve used in bathtub.

BACKGROUND OF THE INVENTION

With the advance of technologies, the bathtub equipment has been significantly improved. In most families, there is equipment for both shower and bathtub and can switch from one to the other. For the shower head, the water pressure is more important to increase the speed of the water flow to have a better result of showering. On the other hand, the bathtub needs a larger amount of water output (per unit time) to effectively reduce the time to fill the bathtub. In conventional bathtubs, the water channels inside the switch valve are symmetric, and the water outlet hole of the ceramic valve piece is only ¼ of the original size, so that the switch valve can only provide the function of switching the water flow, but cannot change the amount of water when switching to the shower head or bathtub. Therefore, the water flow is identical in both the shower head and the bathtub. It is disadvantageous that the flow speed of the shower head too weak, while the amount of water output is not enough to effectively fill the bathtub in a short period of time.

SUMMARY OF THE INVENTION

The present invention is provided to solve the problem that in conventional bathtubs, the water channels inside the switch valve are symmetric, and the water outlet hole of the ceramic valve piece is only ¼ of the original size, so that the switch valve can only provide the function of switching the water flow, but cannot change the amount of water when switching to the shower head or bathtub. Therefore, the water flow is identical in both the shower head and the bathtub. It is disadvantageous that the flow speed of the shower head too weak, while the amount of water output is not enough to effectively fill the bathtub in a short period of time.

To solve and overcome the problems stated above, the present invention provides a fine ceramic switch valve for a bathtub includes a water control valve, a valve piece, a switch valve piece, a control shaft, a valve cover, and a valve shell. The water control valve has a first water outlet hole with smaller size and a second water outlet hole with larger size, and a water outlet trough is recessedly formed on sideway of the water control valve, and connects to the first water outlet hole. The second water outlet hole passes through the water control valve and forms a semi-circular water channel and a fully open circular through hole at the bottom of the water control valve. Also, two protruding portions extend on an upper surface of the water control valve. The valve piece is disposed onto to a surface of the water control valve, and has a first water hole and a second water hole corresponding to the first water outlet hole and second water outlet hole, and two positioning protruding portions are protrudingly formed at an outer edge of the valve piece. The switch valve piece is disposed above the valve piece, and has a semi-circular through flow hole corresponding to the second water outlet hole, and an engaging slot is recessedly formed at an outer edge of the switch valve piece. A driving portion extends from a bottom portion of the control shaft, and is driven and engaged with the engaging slot of the switch valve piece.

Also, a positioning ring slot is recessedly formed at an upper position of the driving portion of the control shaft. The valve cover covers an upper portion of the water control valve, and a plurality of water inlet troughs are formed at an outer edge of the valve cover, and two sets of recessed slots and positioning slots are recessedly formed inside the valve cover, which form a secured positioning with the protruding portions of the water control valve and the positioning protruding portions of the valve piece, respectively. A through opening is formed on top of the valve cover for the control shaft to pass through, and the through opening provides a C-shaped hook to engage with the positioning ring slot of the control shaft. The valve shell is hollow with a receiving space to receive the water control valve, and two water inlet ends and a first water outlet end are formed at an outer edge of the valve shell, and an opening and a second water outlet end are formed at an upper and lower end of the valve shell respectively. According to the structure mentioned above, a fine ceramic switch valve for a bathtub is obtained.

Comparing with the conventional arts, the first water outlet hole and the second water outlet hole of the water control valve are provided for the bathtub and shower head. The first water outlet hole has a smaller diameter and thus a smaller water channel, so the water pressure here is higher to generate a stronger water flow and effectively reduce water output. On the contrary, the second water outlet hole has a larger diameter and thus a larger water channel, so when the water from the water inlet troughs passes through the second water outlet hole of the water control valve, as well as the fully open through hole of the bottom of the water control valve, the amount of water can be significantly increased to reduce the time to fill the bathtub and to increase the convenience and practicability of the switch valve structure.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
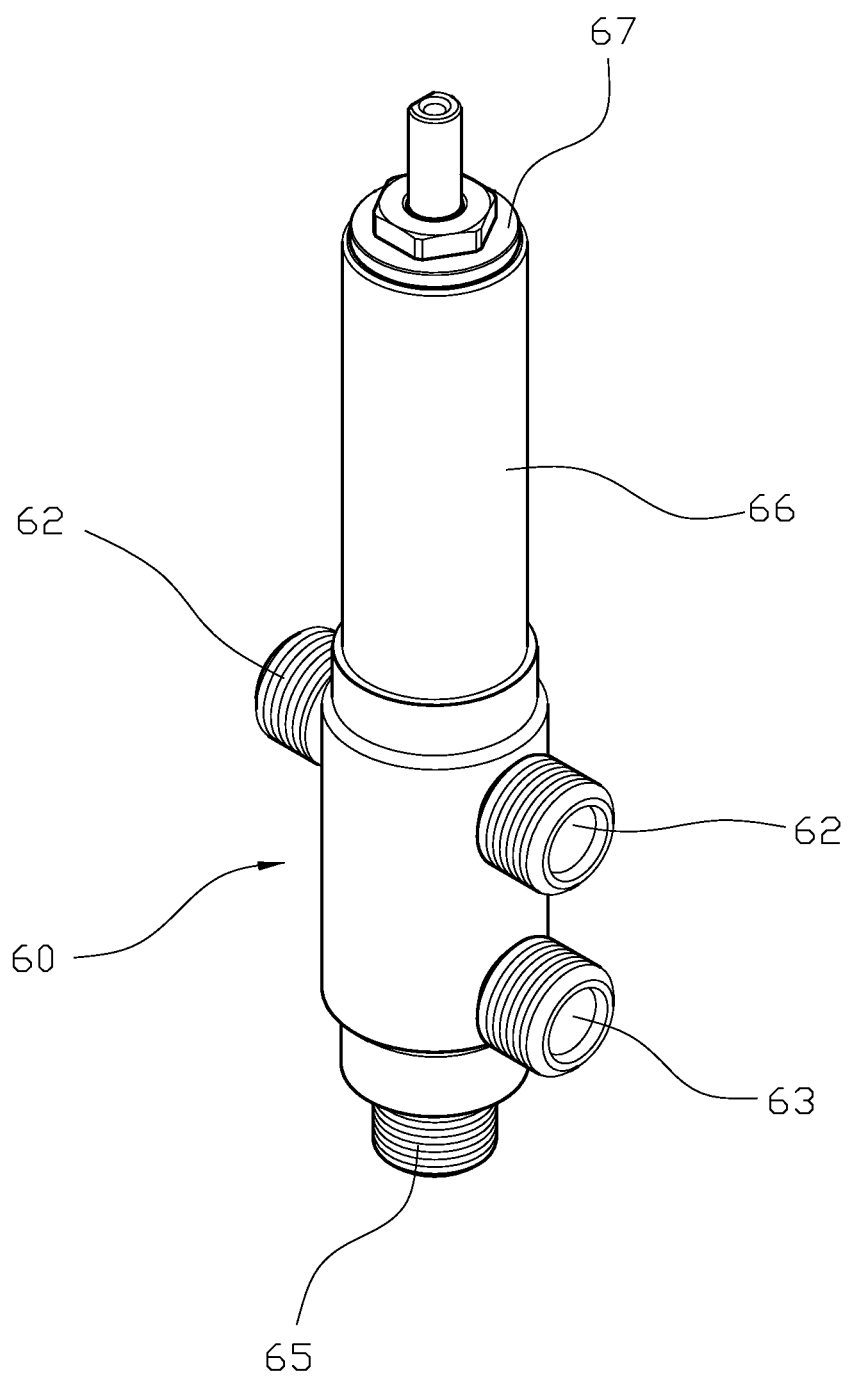
FIG. 1 illustrates a three-dimensional view in the present invention.
Figure 2:
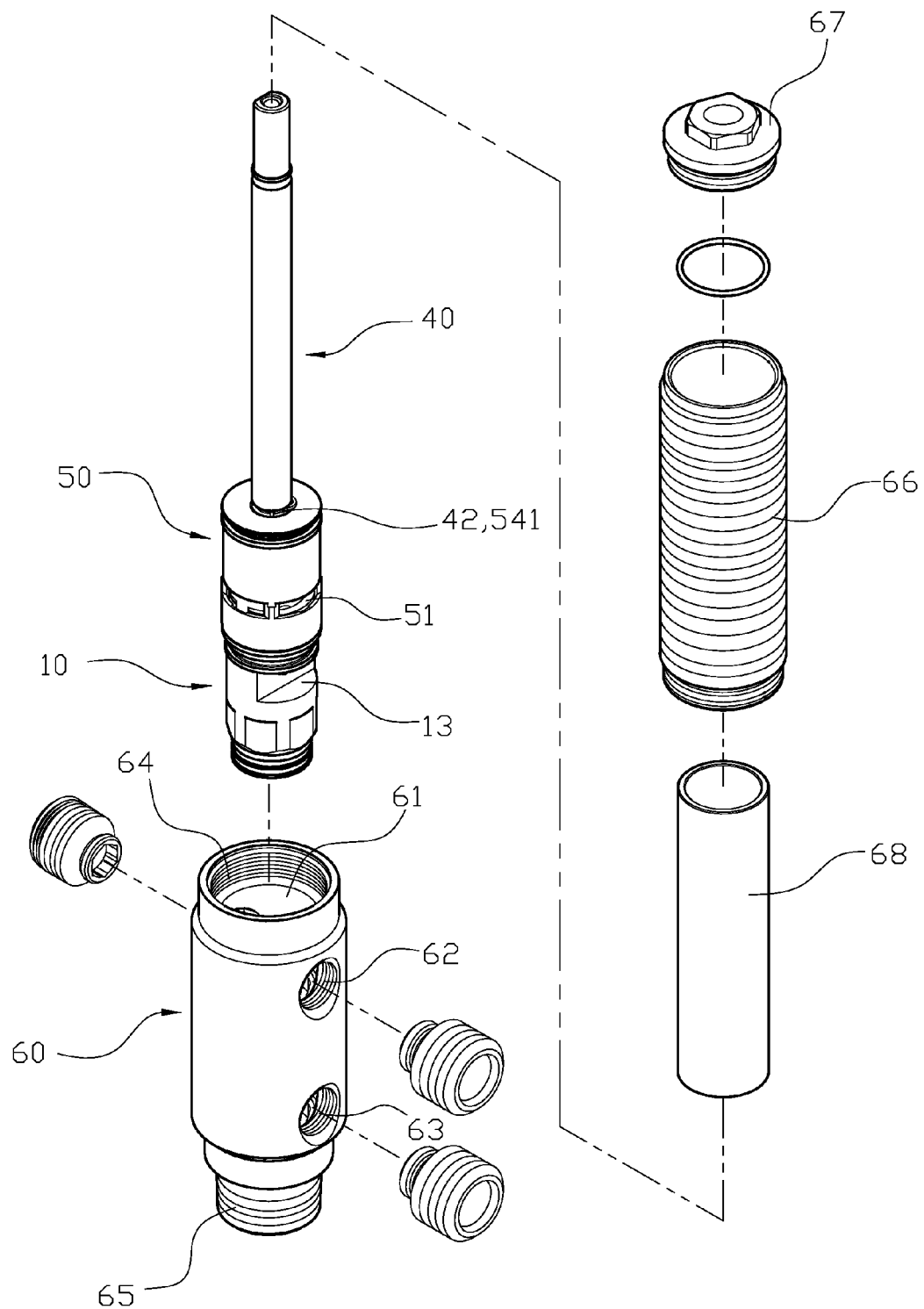
FIG. 2 illustrates a partial exploded view of the valve shell in the present invention.
Figure 3:
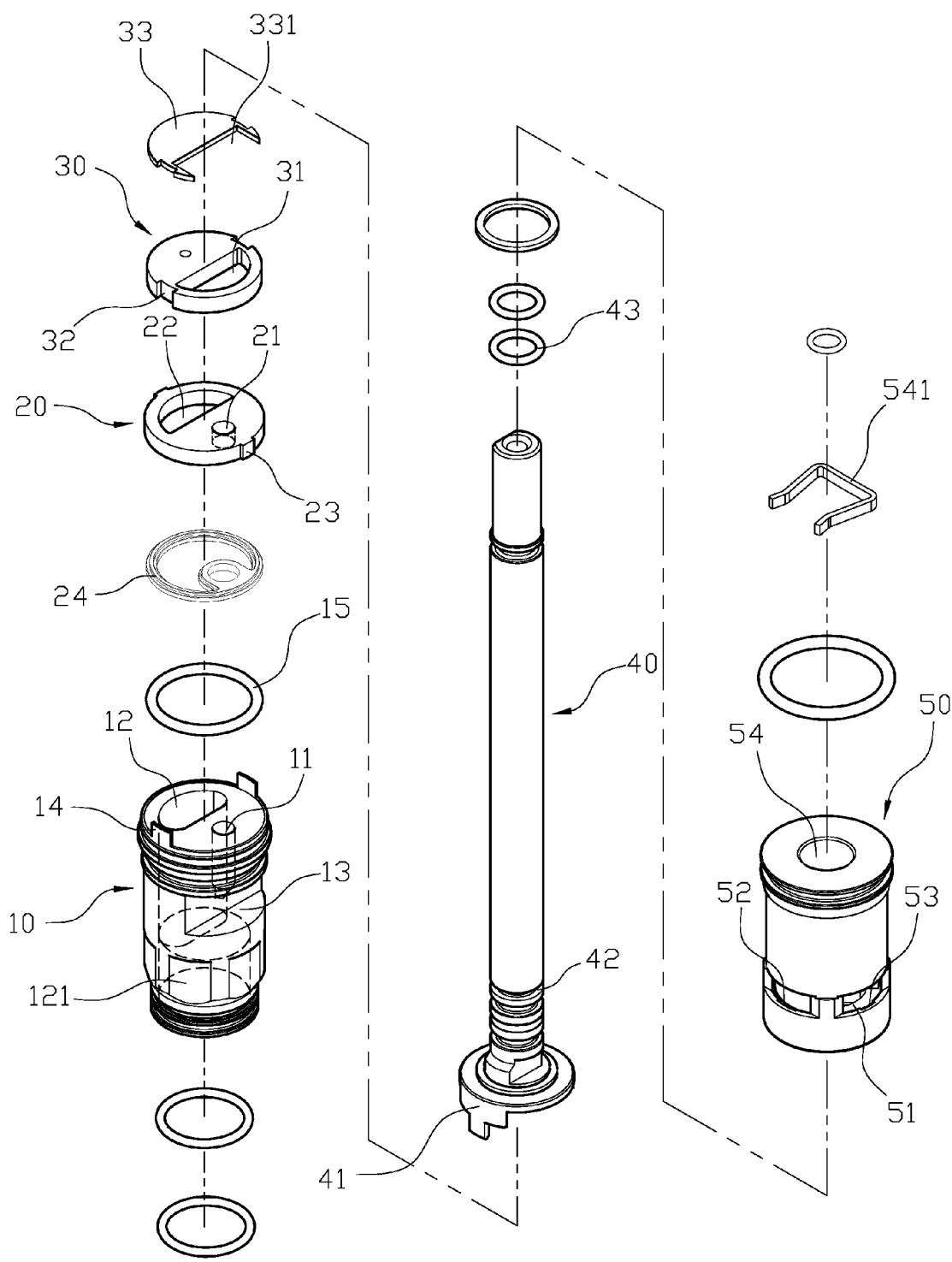
FIG. 3 illustrates an inner exploded view in the present invention.
Figure 4:
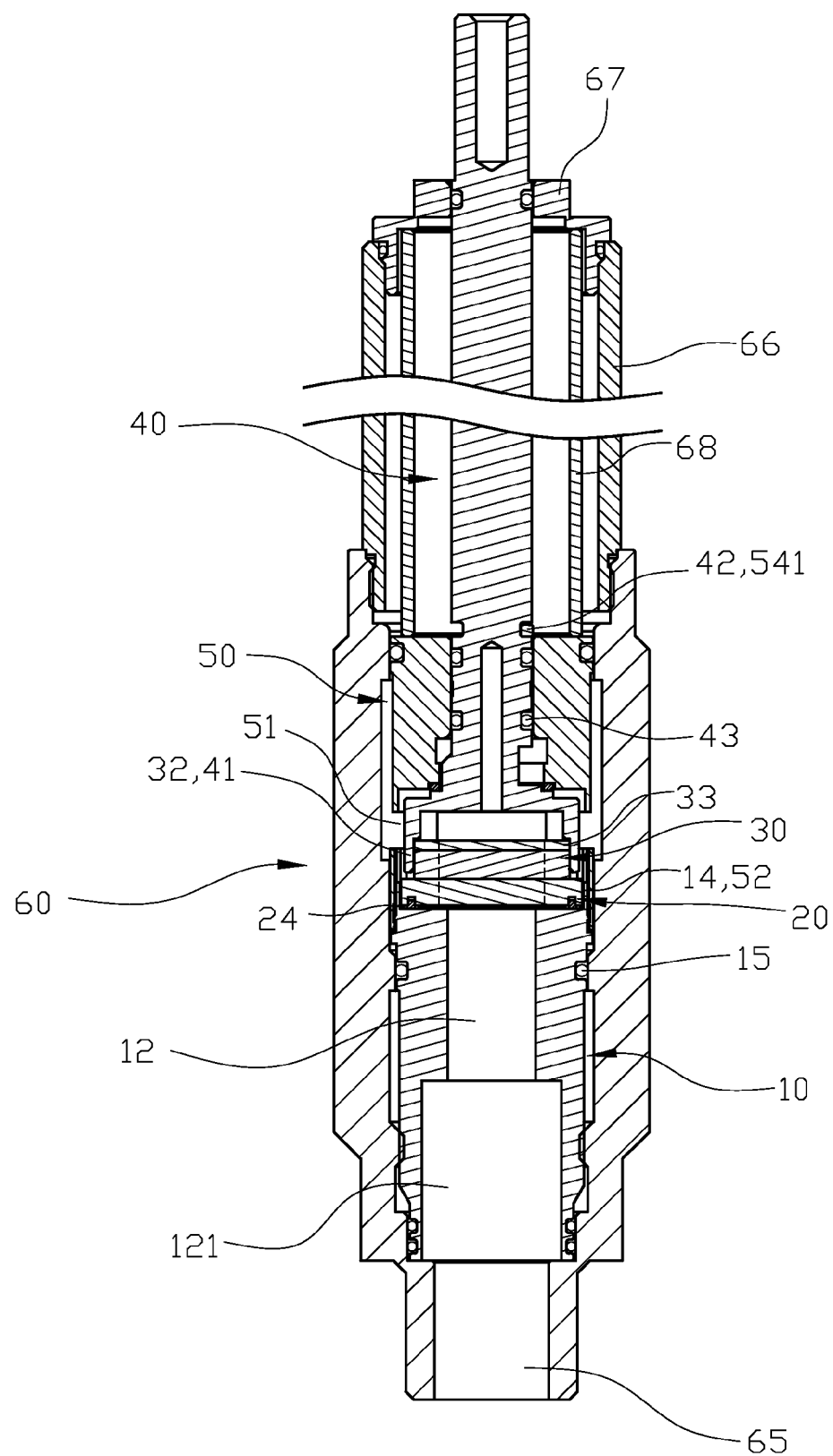
FIG. 4 illustrates a sectional view of the present invention.

In order to further understand the goal, characteristics and effect of the present invention, a number of embodiments along with the drawings are illustrated as following:

Referring to FIGS. 1 to 3, a fine ceramic switch valve for bathtub includes a water control valve (10), a valve piece (20), a switch valve piece (30), a control shaft (40), a valve cover (50) and a valve shell (60). The water control valve (10) has a first water outlet hole (11) with smaller size and a second water outlet hole (12) with larger size, and a water outlet trough (13) is recessedly formed on sideway of the water control valve, and connects to the first water outlet hole (11). The second water outlet hole (12) passes through the water control valve (10) and forms a semi-circular water channel and a fully open circular through hole (121) at the bottom of the water control valve (10). Two protruding portions (14) extend on an upper surface of the water control valve (10), and a plurality of water blocking rings (15) are disposed between the upper surface of the water control valve (10) and the water outlet trough (13). The valve piece (20) is disposed onto to a surface of the water control valve (10), and has a first water hole (21) and a second water hole (22) corresponding to the first water outlet hole (11) and second water outlet hole (12). Two positioning protruding portions (23) are protrudingly formed at an outer edge of the valve piece (20), and a gasket (24) is disposed between the upper surface of the water control valve (10) and the valve piece (20). The switch valve piece (30) is disposed above the valve piece (20), and has a semi-circular through flow hole (31) corresponding to the second water outlet hole (12). An engaging slot (32) is recessedly formed at an outer edge of the switch valve piece (30). A driving portion (41) extends from a bottom portion of the control shaft (40), and is driven and engaged with the engaging slot (32) of the switch valve piece (30). A second gasket (33) is disposed between the driving portion (41) and the switch valve piece (30), and the second gasket (33) forms a flow opening (331) corresponding to the flow hole (31). Also, a positioning ring slot (42) is recessedly formed at an upper position of the driving portion (41) of the control shaft (40), and a plurality of water stopping rings (43) are disposed between the positioning ring slot (42) and the driving portion (41). The valve cover (50) covers an upper portion of the water control valve (10), and a plurality of water inlet troughs (51) are formed at an outer edge of the valve cover (50), and two sets of recessed slots (52) and positioning slots (53) are recessedly formed inside the valve cover (50), which form a secured positioning with the protruding portions (14) of the water control valve (10) and the positioning protruding portions (23) of the valve piece (20), respectively. A through opening (54) is formed on top of the valve cover (50) for the control shaft (40) to pass through, and the through opening (54) provides a C-shaped hook (541) to engage with the positioning ring slot (42) of the control shaft (40). The valve shell (60) is hollow with a receiving space (61) to receive the water control valve (10), and two water inlet ends (62) and a first water outlet end (63) are formed at an outer edge of the valve shell (60), and an opening (64) and a second water outlet end (65) are formed at an upper and lower end of the valve shell (60) respectively. An outer cover tube (66) is formed corresponding to the opening (64) of the valve shell (60), and a locking cover (67) is provided to pass through the control shaft (40) to securely engage with the outer cover tube (66). An inner cover tube (68) is formed between the control shaft (40) and the outer cover tube (66) to increase the stability of the engagement of the outer cover tube (66) and the locking cover (67).

Referring to FIGS. 2 to 5 for the structure in the present invention, the valve piece (20) and the switch valve piece (30) are disposed in order above the water control valve (10), and the gasket (24) is disposed on the upper surface of the water control valve (10) and the valve piece (20). The control shaft (40) is driven and connected with the engaging slot (32) of the switch valve piece (30) through the driving portion (41) at the bottom portion of the control shaft (40), and the second gasket (33) is disposed between the driving portion (41) and the switch valve piece (30). The valve cover (50) is disposed onto the upper portion of the water control valve (10) through the control shaft (40) and the through opening (54), and the recessed slots (52) engage with the protruding portions (14) of the water control valve (10), while the positioning slots (53) engage with the positioning protruding portions (23) of the valve piece (20). A C-shaped hook (541) is provided at the through opening (541) of the valve cover (50), and engages with the positioning ring slot (42) of the control shaft (40), so that the control shaft (40) and the valve cover (50) can be securely engaged. Also, the water control valve (10), valve piece (20), switch valve piece (30), control shaft (40), and valve cover (50) are disposed in the valve shell (60) after being assembled, so that the water outlet trough (13) of the water control valve (10) and the first water outlet end (63) are connected, while the water inlet troughs (51) of the valve cover (50) are connected with the water inlet ends (62). The outer cover tube (66) extends from the opening (64) of the valve shell (60), and the locking cover (67) is disposed on top of the outer cover tube (66), while the inner cover tube (68) is formed between the outer cover tube (66) and the control shaft (40). The inner cover tube (68) is locked downward through the locking cover (67) to improve the stability of the engagement of the outer cover tube (66) and the locking cover (67). Furthermore, the valve cover (50) is pressed and restricted by the inner cover tube (68) to obtain a fine ceramic switch valve of a bathtub.

Figure 5:
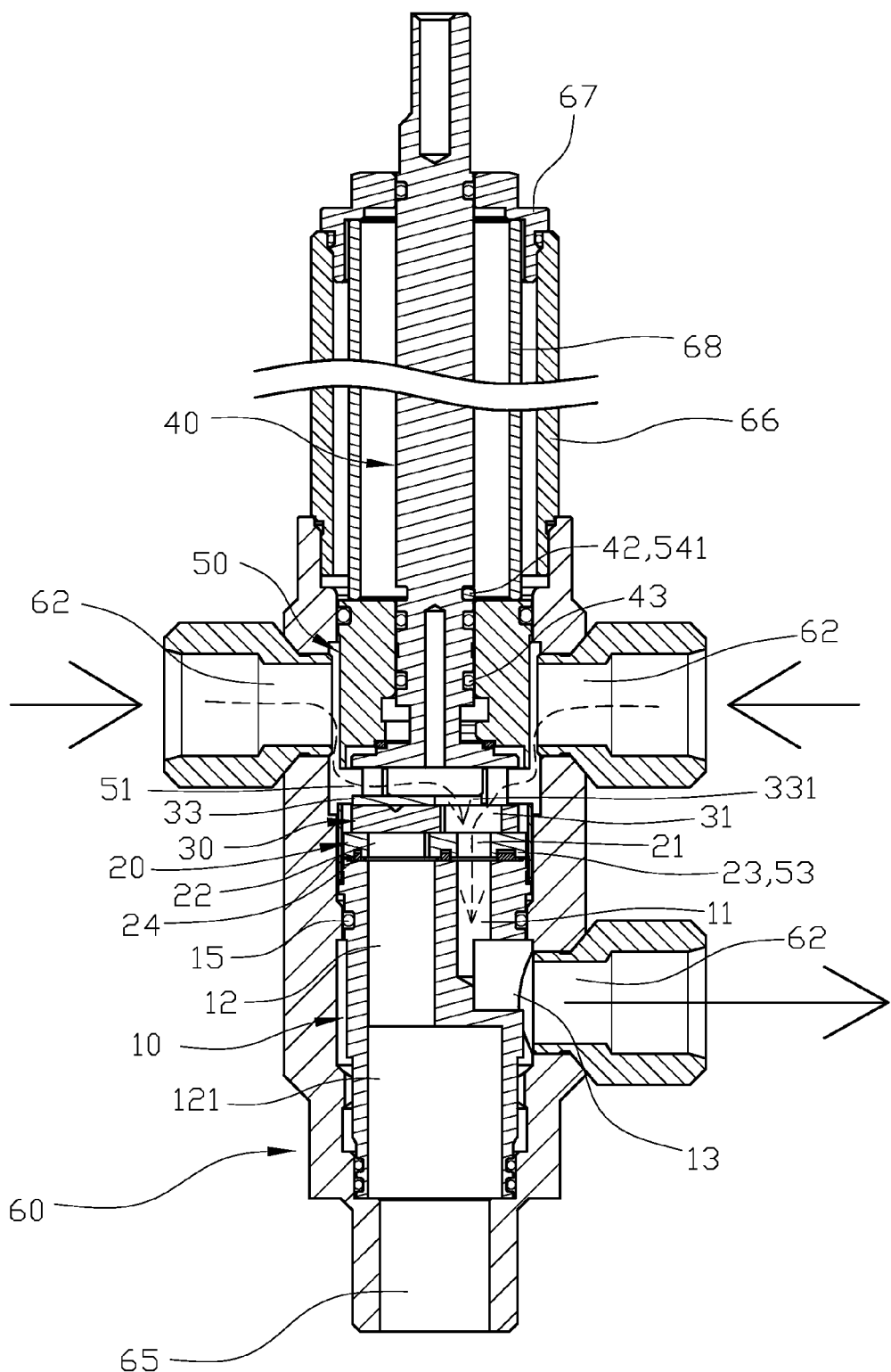
FIG. 5 illustrates a sectional view from another view angle in the present invention (with the shower head).
Figure 6:
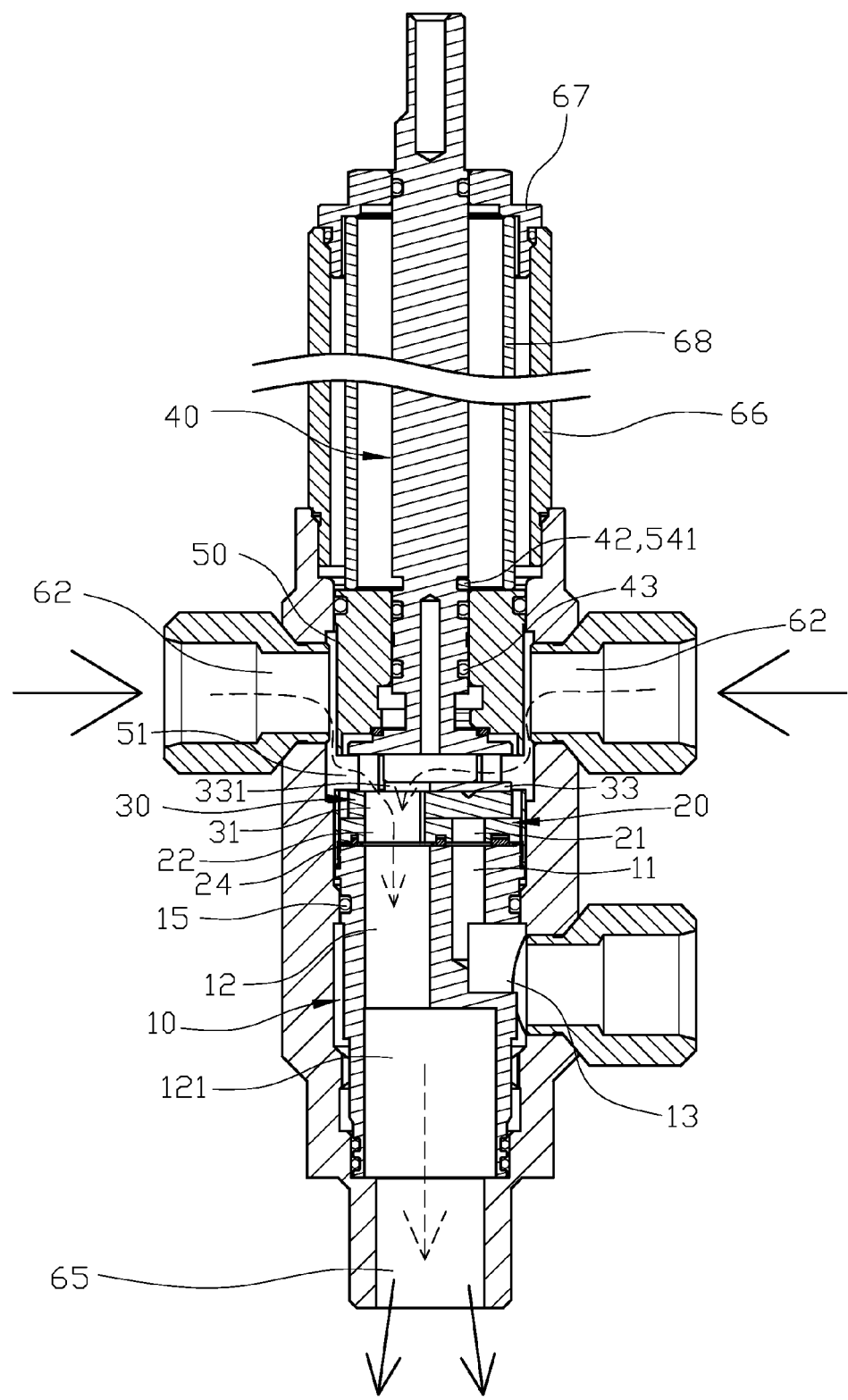
FIG. 6 illustrates a sectional view from another view angle (different from FIG. 5) in the present invention (with the shower head).

Referring to FIGS. 5 and 6 for the structure of the present invention, the fine ceramic switch valve is disposed at the water outlet end of the bathtub to provide for the bathtub and shower head. Two water inlet ends (62) of the valve shell (60) are connected to a cold and a hot water sources respectively, and the first water outlet end (63) and the second water outlet end (65) are connected with the shower head and the bathtub respectively, so that when the water comes out from the shower head, the control shaft (40) is activated through the switch valve piece (30) to connect the flow hole (31) with the first water hole (21) of the valve piece (20), and the water from the water inlet ends (62) can flow through the water inlet troughs (51) of the valve cover (50) to the first water outlet hole (11) of the water control valve (10). Also, the diameter of first water outlet hole (11) is smaller, so when the water is outputted from the water outlet trough (13) to the first water outlet end (63) of the valve shell (60) and then to the shower head, the water pressure is higher to generate stronger water flow. On the contrary, if the user wish to make the bathtub full of water, he/she can rotate the control shaft (40) to the other direction to drive the switch valve piece (30) to connect the flow hole (31) with the second water hole (22) of the valve piece (20). At this time, the water from the water inlet troughs

(51) passes through the second water outlet hole (12) of the water control valve (10) to accommodate a larger amount of water, as well as using the fully open through hole (121) of the bottom of the water control valve (10), to reduce the time to fill the bathtub.

According to the embodiments discussed above, the present invention is advantageous that the first water outlet hole (11) and the second water outlet hole (12) of the water control valve (10) are provided for the bathtub and shower head. The first water outlet hole (11) has a smaller diameter and thus a smaller water channel, so the water pressure here is higher to generate a stronger water flow and effectively reduce water output. On the contrary, the second water outlet hole (12) has a larger diameter and thus a larger water channel, so when the water from the water inlet troughs (51) passes through the second water outlet hole (12) of the water control valve (10), as well as the fully open through hole (121) of the bottom of the water control valve (10), the amount of water can be significantly increased to reduce the time to fill the bathtub and to increase the convenience and practicability of the switch valve structure.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. A fine ceramic switch valve for a bathtub, comprising:
   a water control valve, having a first water outlet hole with smaller size and a second water outlet hole with larger size, and a water outlet trough that connects to the first water outlet hole recessedly formed on sideway of the water control valve, wherein the second water outlet hole passes through the water control valve and forms a semi-circular water channel and a fully open circular through hole at the bottom of the water control valve, and two protruding portions extend on an upper surface of the water control valve;
   a valve piece, disposed onto to a surface of the water control valve, and having a first water hole and a second water hole corresponding to the first water outlet hole and second water outlet hole, wherein two positioning protruding portions are protrudingly formed at an outer edge of the valve piece;
   a switch valve piece, disposed above the valve piece, and having a semi-circular through flow hole corresponding to the second water outlet hole, and an engaging slot recessedly formed at an outer edge of the switch valve piece;
   a control shaft, having a driving portion extending from a bottom portion of the control shaft, and driven and engaged with the engaging slot of the switch valve piece, wherein a positioning ring slot is recessedly formed at an upper position of the driving portion of the control shaft;
   a valve cover, covering an upper portion of the water control valve, and a plurality of water inlet troughs formed at an outer edge of the valve cover, wherein two sets of recessed slots and positioning slots are recessedly formed inside the valve cover, which form a secured positioning with the protruding portions of the water control valve and the positioning protruding portions of the valve piece, respectively, wherein a through opening is formed on top of the valve cover for the control shaft to pass through, and the through opening provides a C-shaped hook to engage with the positioning ring slot of the control shaft; and
   a valve shell, which is hollow with a receiving space to receive the water control valve, wherein two water inlet ends and a first water outlet end are formed at an outer edge thereof, and an opening and a second water outlet end are formed at an upper and lower end of the valve shell respectively.

2. The fine ceramic switch valve of claim 1, wherein a plurality of water stopping rings are disposed between the positioning ring slot and the driving portion of the control shaft.

3. The fine ceramic switch valve of claim 1, wherein a gasket is disposed between the upper surface of the water control valve and the valve piece.

4. The fine ceramic switch valve of claim 1, wherein second gasket is disposed between the driving portion and the switch valve piece, and the second gasket forms a flow opening corresponding to the flow hole.

5. The fine ceramic switch valve of claim 1, wherein an outer cover tube is formed corresponding to the opening of the valve shell, and a locking cover is provided to pass through the control shaft to securely engage with the outer cover tube.

6. The fine ceramic switch valve of claim 5, wherein an inner cover tube is formed between the control shaft and the outer cover tube to increase the stability of the engagement of the outer cover tube and the locking cover.

7. The fine ceramic switch valve of claim 1, wherein a plurality of water blocking rings are disposed between an upper surface of the water control valve and the water outlet trough.

* * * * *